United States Patent [19]

Huber

[11] Patent Number: 4,762,360
[45] Date of Patent: Aug. 9, 1988

[54] DEMOUNTABLE PICK-UP TRUCK TONNEAU COVER

[76] Inventor: Roy L. Huber, 11609 Lehigh Court., Plymouth, Mich. 48170

[21] Appl. No.: 921,618

[22] Filed: Oct. 21, 1986

[51] Int. Cl.$^4$ ............................................. B60P 7/02
[52] U.S. Cl. ............................... 296/100; 296/57 R; 49/395
[58] Field of Search ............... 296/100, 101, 106, 50, 296/56, 57 R; 49/395

[56] References Cited

U.S. PATENT DOCUMENTS

| | | | |
|---|---|---|---|
| 2,886,375 | 5/1959 | Crawford | 296/100 |
| 3,489,456 | 1/1970 | Klanke | 296/100 |
| 3,704,039 | 11/1972 | Dean | 296/100 |
| 4,522,440 | 6/1985 | Gostomski | 296/100 |
| 4,629,243 | 12/1986 | Jensen | 296/100 |

FOREIGN PATENT DOCUMENTS

| | | | |
|---|---|---|---|
| 847498 | 10/1939 | France | 49/395 |
| 1570605 | 6/1969 | France | 49/395 |

Primary Examiner—Robert B. Reeves
Assistant Examiner—Joseph D. Pape
Attorney, Agent, or Firm—Rhodes and Boller

[57] ABSTRACT

A demountable tonneau cover for enclosing the open top of a pick-up truck cargo box comprises a relatively light-weight laminated panel which fits onto the open top of the cargo box to enclose the cargo space. Two pairs of spring-loaded pins are mounted on the interior of the cover along opposite sides for releasably latching the cover to the sides of the cargo box. These pins are inaccessible from the exterior of the cargo box when the cover is on the box. Cables extend from the spring-loaded pins through passages within the cover to pull handles which are also mounted on the interior of the cover adjacent the rear edge. The pins are normally biased to extended positions for fitting into holes in the sides of the cargo box and thereby latching the cover in place on the cargo box. When the pull handles are operated, the pins are retracted out of the holes thereby allowing the cover to be displaced from the position enclosing the cargo space. The pull handles are inaccessible when the cover is in place on the box for enclosing the cargo space and the tailgate forming the rear of the cargo box is closed, but they are rendered accessible when the tailgate is opened. The tailgate is locked by a key-operated lock thereby prohibiting access to the pull handles, and hence preventing access to the cargo space or removal of the cover without a key for unlocking the tailgate.

22 Claims, 4 Drawing Sheets

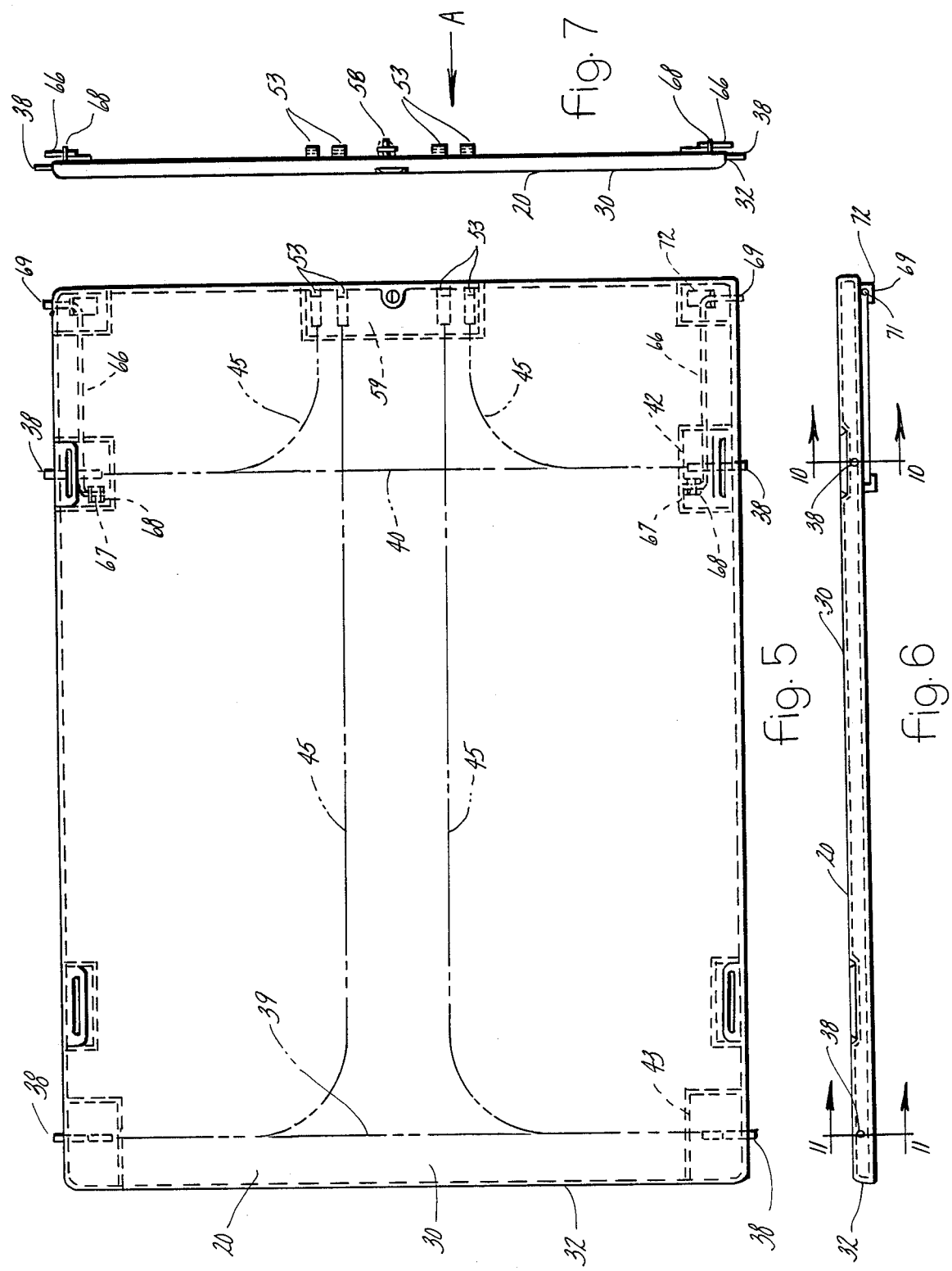

DEMOUNTABLE PICK-UP TRUCK TONNEAU COVER

BACKGROUND AND SUMMARY OF THE INVENTION

This invention relates to pick-up truck covers and more particularly to a demountable light-weight and lockable cover for enclosing a pick-up truck cargo box.

The popularity of the pick-up truck with the handyman, camper and vacationer has significantly increased because of its utility combined with recent improvements in styling and comfort. An inherent disadvantage of the pick-up truck is the open cargo box which exposes articles to weathering and losses by theft. Numerous styles of tonneau covers have heretofore been offered, however, despite the recognized need for tonneau covers, the majority of pick-up owners have been dissuaded from purchasing them because of high cost, poor appearance, inadequate security, difficult installation, lack of utility and difficult tonneau cover storage. Consequently, a large number of prospective customers are available for an improved pick-up truck tonneau cover.

The present invention addresses the limitations of prior tonneau covers by offering security, attractive styling, moderate cost, simple installation, improved utility and ease of storage. Moreover, in most cases, the light-weight tonneau cover can be installed or removed by a single person.

One benefit of the tonneau cover is improved fuel economy from reduced aerodynamic drag. Among the features of the cover is a double acting latching means for retaining the cover to a cargo box which provides convenient access to the front or rear of the box. Another feature is a means for propping the cover in a partially open position to partially open the cargo box when it is used as a sleeping compartment by hunters or campers. Still yet another feature is a cylinder key which by a single key locks the truck tailgate to the tonneau cover and prevents access to the cargo space. Still yet another feature is a convenient operator means for releasing the tonneau cover which is readily accessible when the tailgate is unlocked, but inaccessible when the tailgate is locked.

The light-weight demountable tonneau cover comprises a relatively light-weight laminated structure which subtends the open top of the cargo box. Two pairs of spring-biased pins are mounted on opposite sides of the tonneau cover for releasably latching the cover to the sides of the cargo box. The pins are inaccessible from the exterior of the cargo box when the cover is on the box.

Pull cables are attached to the spring-biased pins and are internally routed through passages in the cover to pull handles attached to the other end portions of the cables and located on the underside of the cover such that they are accessible only when the tailgate of a truck to which the cover is mounted is open.

The pins are normally biased to outward extended positions for fitting into holes in the sides of a cargo box to latch the cover in place on the cargo box.

When the pull handles are operated, the pins retract out of the holes, allowing the cover to be displaced for access to the cargo space. The pull handles are inaccessible when the cover is in enclosing relation to the cargo box and the tailgate forming the rear of the cargo box is closed, but are accessible when the tailgate is opened.

The lock for securing to the rear end portion of the tonneau cover to the tailgate prohibits removal of the cover without a key for unlocking the tailgate.

Further features of the invention along with additional benefits and objects will become apparent from reference to the drawings and ensuing detailed description of the preferred embodiment of the invention which discloses the best mode contemplated in carrying out the invention. The exclusive rights which are claimed are particularly and distinctly set forth in each of the numbered claims following the detailed description of the preferred embodiment.

BRIEF DESCRIPTION OF THE DRAWINGS

FIG. 5 is a plan view of the tonneau cover drawn to an enlarged scale from FIG. 1 with the outer seal removed.

FIG. 6 is a side elevational view of the tonneau cover shown in FIG. 5.

FIG. 7 is an end elevational view of the tonneau cover shown in FIG. 5.

DESCRIPTION OF THE PREFERRED EMBODIMENT

Figure 2:
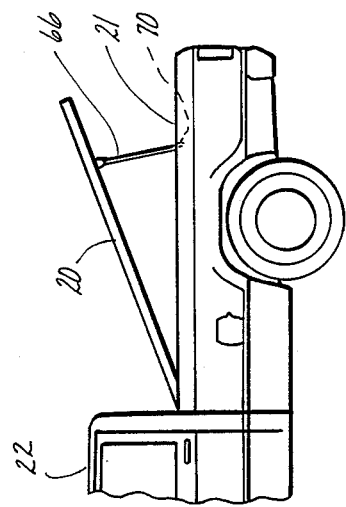
FIG. 2 is a side elevational view of the pick-up truck shown in FIG. 1.
Figure 4:
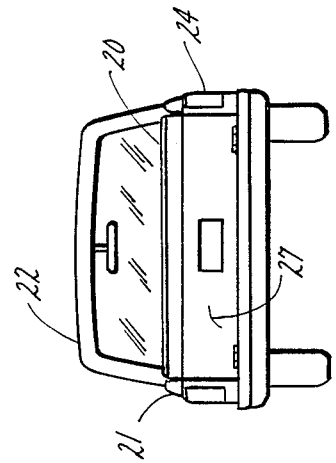
FIG. 4 is a rear elevational view of the pick-up truck shown in FIG. 1.
Figure 1:
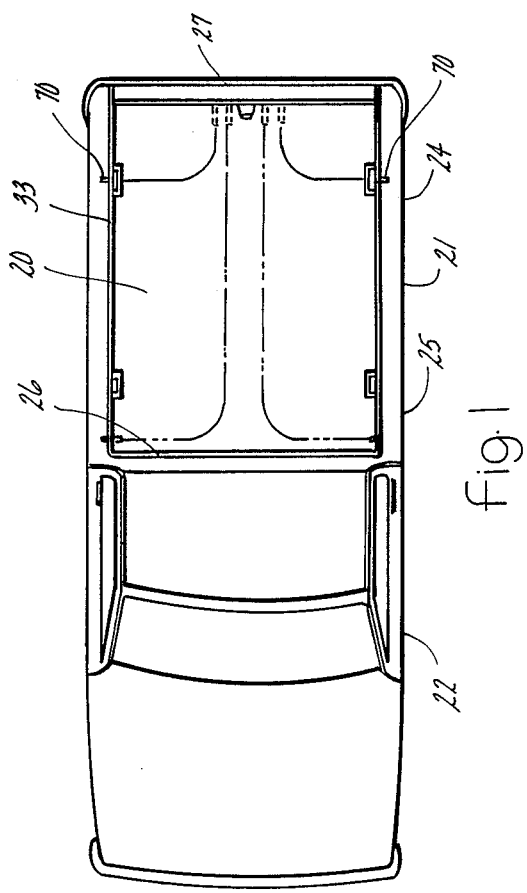
FIG. 1 is a plan view of a pick-up truck showing the present invention of a tonneau cover mounted on the cargo box of the truck.
Figure 3:
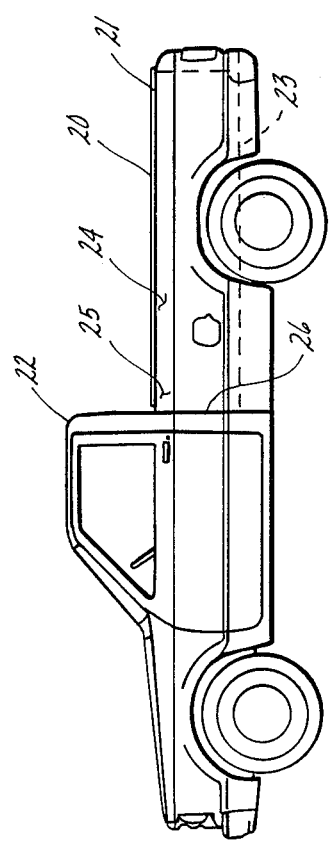
FIG. 3 is a partial side elevational view of the pick-up truck of FIG. 1 showing the tonneau cover in a raised position.
Figure 8:
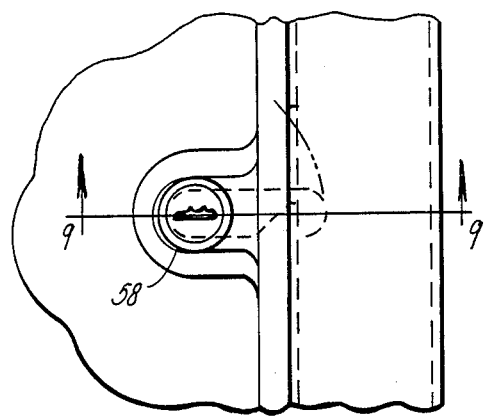
FIG. 8 is a partial plan view of the tonneau cover of FIG. 6 drawn to an enlarged scale from FIG. 6 showing the key lock of the tonneau cover.
Figure 11:
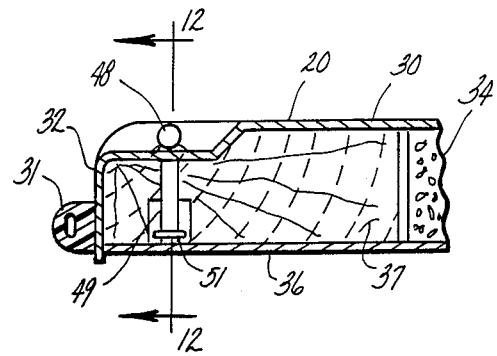
FIG. 11 is a sectional view taken on the line 11—11 of FIG. 6 drawn to an enlarged scale and showing one of the lifting handles of the tonneau cover.
Figure 9:
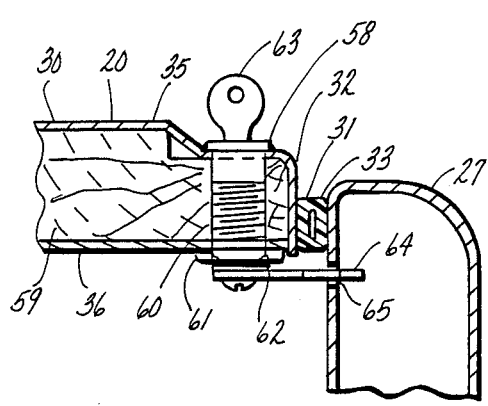
FIG. 9 is a sectional view taken on the line 9—9 of FIG. 8.
Figure 12:
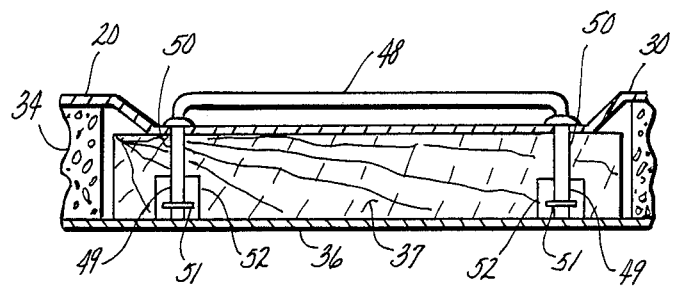
FIG. 12 is a sectional view taken on the line 12—12 of FIG. 11.
Figure 10:
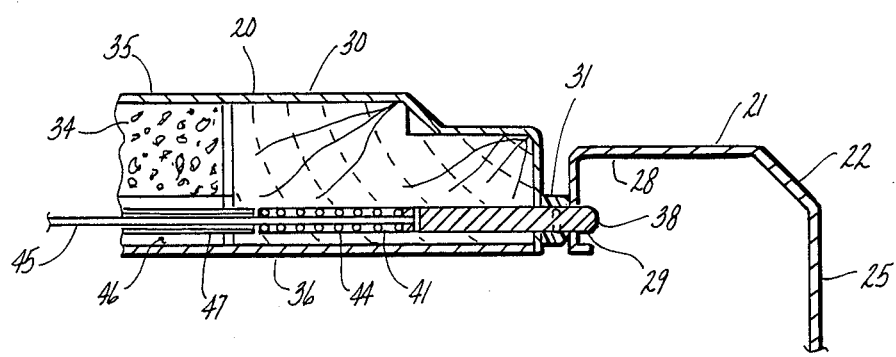
FIG. 10 is a sectional view taken on the line 10—10 of FIG. 6 drawn to an enlarged scale and showing one of the spring-biased retention pins of the tonneau cover.
Figure 13:
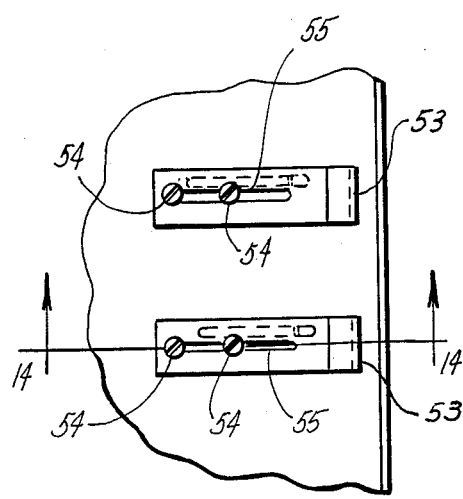
FIG. 13 is a view taken in the direction of arrow A in FIG. 7 showing one pair of pull handles of the tonneau cover.
Figure 14:
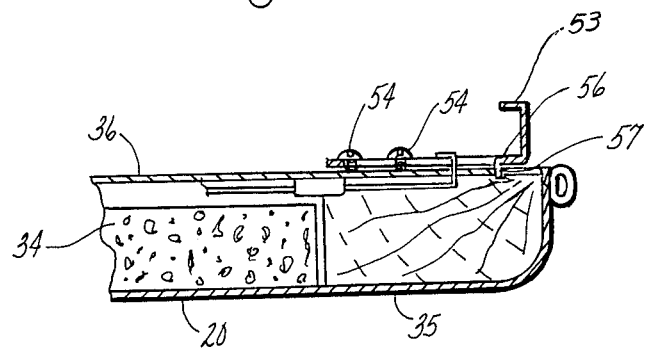
FIG. 14 is a sectional view taken on the line 14—14 of FIG. 13.

Referring now to the drawings, and in particular FIGS. 1 through 3, inclusive, the particular embodiment of the invention which is illustrated therein for disclosure purposes, is a generally rectangular tonneau cover 20 which subtends the open area at the top of a pick-up truck cargo box 21 to enclose the space within the box.

The pick-up truck 22 in the drawings is conventional and has a cargo box 21 which comprises a generally horizontal floor 23 and a generally vertical adjoining side structure 24 which cooperates with the floor 23 to form a cargo space bounded on the bottom by the floor 23 and laterally by the adjoining side 24.

The cargo box side structure 24 has a pair of spaced apart side walls 25 extending fore-and-aft and adjoining the lower side edge portions of the floor 23, a laterally extending front wall 26 adjoining the front edge portion of the floor 23 and the front edge portions of the side walls 25, and a tailgate 27 extending laterally between the side walls 25 along the rear of the cargo space.

The top portions of the cargo box side walls 25 are inverted channels which form structural fore-and-aft upper rails 28 for the body side walls 25. In the vertical inner portion of each side wall rail 28 is a pair of holes 29 which are provided either by a manufacturer or drilled by an installer during the initial installation of the tonneau cover 20.

The tailgate 27 which encloses the rear of the cargo box 21 is mounted to the rear edge portion of the floor 23 for pivotal movement from a substantially vertical position shown in FIGS. 1 through 3 to a horizontal position (not shown) which is substantially co-planar with the floor 23.

The tonneau cover 20, in FIGS. 1 through 3, inclusive, is in cooperative enclosing relationship with the cargo box 21, and is comprised of a relatively rigid, but relatively light-weight panel 30, a means for releasably securing the panel to the side structure 24 of a cargo box 21, a means for operating the means which releasably secures the panel to the cargo box 21, and a means for releasably locking the tailgate 27 in lateral bounding relation to the tonneau cover 20.

The generally rectangular panel 30 of the tonneau cover 20 has an overall size which is slightly smaller than the open area at the top of the cargo box 21. Around the perimeter of the panel there is provided a flexible seal 31 which is suitably bonded to the vertical outer surface 32 of the panel 30, for sealing the gap 33 between the panel 30 and cargo box 21.

The light-weight panel 30 is comprised of a relatively rigid plastic cellular core 34 and an upper plastic outer skin 35 and thin aluminum or plastic lower wall 36 suitably bonded to the cellular core 34. Additionally, there is provided in the interior of the panel 30 several reinforcements made of wood or some other suitable material attached to the interior of the panel 30.

With reference to FIGS. 1 and 5, the light-weight panel 30 is releasably secured to the side structure 24 of the cargo box 21 by two pairs of spring-biased pins 38 which normally engage the holes 29 in vertical inner portions of the cargo box side wall rails 28. One pair of pins 38 is mounted in a marginal edge portion of the panel 30 and another symmetrical pair is mounted in the oposite marginal edge portion of the panel 30. The spring-biased pins 38 at opposite sides of the panel 30 are aligned such that front 39 and rear 40 pivot axes are established about which the panel 30 can be alternatively rotated for convenient access to the front and rear of the cargo box 21 by disengaging one pair of aligned pins 38 from the side wall upper rails 28 and pivoting the panel 30 about the other pair of aligned pins 38.

Each pin 38 is a slender round member slideably mounted in a transverse aperture 41 of a wooden reinforcement 42, 43 suitably joined to the panel 30. There is provided in the aperture 41 a wire compression spring 44 which presses against the inner end of the pin 38 to normally engage the pin 38 with the hole 29 in the side wall rail 28. The inner end of the pin 38 is suitably attached to one end of a corresponding cable 45 which is positioned in its own channel 46 in the lower portion of the cellular core 34 of the panel 30. The end portion of the cable sheath 47 nearest the pin 38 is attached to the wooden reinforcement 42, 43 in which the pin 38 is mounted.

In the wooden reinforcements 42 of the rear pins 38 is a pair of fore-and-aft vertical holes 50 which receive an inverted U-shaped lifting handle 48. The vertical legs 49 of the lifting handle 48 which is preferably formed from wire, extend downwardly through the vertical holes 50 of the wooden reinforcement 42 and the lower end portion of each leg 49 receives a clip 51 for retaining the handle 48 in the panel 30. The lower portions 52 of the vertical holes 50 of the wooden reinforcement 42 are counterbored to provide clearance to the clips 51 of the lifting handles 48.

The other end portion of each cable 45 is attached to a corresponding stamped U-shaped pull handle which is slideably mounted to the underside of the panel 30 on two downwardly extending screws 54. The screws 54 pass through a slot 55 in the pull handle and engage a wooden reinforcement at the rear end portion of the panel. In the horizontal leg of the pull handle 53 there is provided an upwardly extending tab 56 for engaging a hole 57 in the lower wall 36 of the panel 30 to retain the handle 53 and hence the corresponding pin, in the retracted position when the tab 56 is adjacent to the hole 57 and the handle 53 is vertically lifted.

It will be observed from the drawings that the pull handles 53 of the cables 45 are located in pairs symmetrically disposed about the longitudinal centerline of the panel 20 and are accessible only when the tailgate 27 is unlocked and rotated away from the cargo box 21. To disengage a pin 38 from its hole 29 in the side wall rail 28, the corresponding handle 53 is pulled rearwardly.

Centered at the rear edge portion of the panel 30 is a vertically disposed conventional key cylinder lock 58 which is retained in the wood reinforcement 59 at rear portion of the cover 20. The lock 58 passes through an aperture 60 in the wood reinforcement 59 and is retained by the threaded engagement with a hex nut 61 at the lower end portion of the lock 58.

The cylinder 62 of the lock 58 is rotatable with a key 63 and at the lower end portion of the lock cylinder 62 there is attached a pawl 64 which in a locked condition engages a slot 65 in the inner wall of the tailgate 27 to lock the tailgate 27 to the tonneau cover 20.

With reference to FIGS. 5 and 6, at each side of the panel there is provided a wire prop rod 66 for supporting the panel 30 in an open position (see FIG. 3). This is particularly useful during the loading and unloading of articles from the cargo box and when the cargo space is used during camping for sleeping.

The front end portion 67 of the prop rod 66 is bent inwardly and rotatably mounted in a bracket 68 which is attached to the underside of the panel 30. The rear end portion 69 of the prop rod 66 is bent inwardly and engages the rear pin hole 70 in the cargo box side rail 28 when the rod 66 is used for supporting the panel 30 in an open position. Otherwise, when the panel 30 is closed, the rear end portion 69 of the prop rod 66 engages a slot 71 in a vertical leg of an inverted L-bracket 72 which is attached to the underside of the panel 30.

Although but a single embodiment of my invention has been disclosed, it will be appreciated that other embodiments can be derived from my invention by changes in size, shape and the substitution and arrangement of components without departing from the spirit thereof.

What is claimed is:

1. In a pick-up truck having a chassis-mounted cargo box comprising a generally horizontal floor and a generally vertical wall structure cooperating with said floor to form a cargo space which is bounded on the bottom by said floor and laterally by said vertical wall structure, but which is open at the top, said vertical wall structure including a gate which is movable from a position laterally bounding the cargo space to a position which does not laterally bound the cargo space, and a tonneau cover cooperating with the open top of the cargo box to enclose the cargo space at the top, the improvement which comprises:

said cover comprising a relatively rigid, but relatively light-weight, panel, which, when disposed in cooperative relationship with the open top of the cargo box to enclose the cargo space, is generally horizontally disposed, said panel comprised of a relatively rigid plastic cellular core, a thin upper outer skin bonded to the upper and outer surfaces of the cellular core and a thin lower wall joined to the cellular core;

means for releasably securing said panel to said vertical wall structure comprising at least one releasable latch disposed at a selected location for performing a releasable latch function between the panel and said vertical wall structure, means for operating said releasable latch from latching to non-latching condition, said means for releasing said latch being substantially within the interior of the lightweight panel, including at least one operator means which is remote from said releasable latch and which, when the panel is disposed on the box in covering relation to the cargo space and the gate is in laterally bounding relation to said cargo space, is inaccessible for operation;

and means for releasably locking said gate in laterally bounding relation to said cargo space by means of a key-operated mechanism which is accessible for operation exterior of the cargo space.

2. The improvement set forth in claim 1 in which said latch comprises a pin which is carried by said panel and which, in latching condition, passes into a hole in said side, and, in non-latching condition, is free of said hole.

3. The improvement set forth in claim 2 including means for resiliently biasing said pin toward latching condition.

4. The improvement set forth in claim 3 in which said operator means is carried by said panel and said means for operating said releasable latch comprises a cable extending from said pin to said operator means and disposed in a cable-locating guide in said panel.

5. The improvement set forth in claim 4 in which said operator means comprises a pull handle which is disposed at a marginal edge portion of said panel which is juxtaposed to said gate, and said pull handle is arranged for motion along a direction which is transverse to the direction of motion of said pin between latching and non-latching conditions.

6. The improvement set forth in claim 1 in which said means for releasably locking said gate is carried by said panel along said marginal edge portion of said panel and comprises a pawl which is operable into and out of locking engagement with said gate.

7. The improvement set forth in claim 1 in which there are two pairs of said releasable latches, one pair at one marginal edge portion of said panel and the other pair at another marginal edge portion of said panel, said two marginal edge portions of said panel being parallel with each other.

8. The improvement set forth in claim 7 in which the two latches of each pair are carried by said panel and are spaced apart from each other longitudinally, and at least one of said latches comprises a horizontal pin which translates axially between latching and non-latching conditions.

9. The improvement set forth in claim 8 in which at least one latch of each said pair comprises said horizontal pin, and the pin of said at least one latch of said one pair is coaxial with the pin of said at least one latch of said other pair.

10. The improvement set forth in claim 8 in which both said latches of each pair comprises said horizontal pin and each pin of said one pair is coaxial with a corresponding pin of said other pair.

11. The improvement set forth in claim 10 in which each pin is operated between latching and non-latching conditions by a corresponding individual one of said operator means, said means being carried by said panel and disposed along another marginal edge portion of said panel which extends between the first-two-mentioned marginal edge portions of said panel and which is juxtaposed to said gate.

12. The improvement set forth in claim 11 in which said operator means are guided on said panel for horizontal translation along directions which are transverse to the directions of translation of said pins.

13. The improvement set forth in claim 12 in which the pins translate in parallel paths and said operator means translate along parallel paths, the paths of of said operator means being at 90 degrees to the paths of said pins when said releasable latches are operated from said latching to said non-latching conditions.

14. The improvement set forth in claim 12 in which said means for releasably locking said gate is carried by said panel at said another marginal edge portion of said panel.

15. The improvement set forth in claim 14 in which said means for releasably locking said gate comprises a pawl which is operable into and out of locking engagement with said gate, and said pawl is disposed on said panel such that the operator means for said one pair of latches are to one side of said pawl along said another marginal edge portion and the operator means for said other pair of latches are to the other side of said pawl along said another marginal edge portion.

16. The improvement set forth in claim 12 in which each pin is operatively coupled to its operator means by a cable which is disposed within its own cable-locating guide in said panel.

17. The improvement set forth in claim 8 including two pairs of lifting handles on said panel, one pair of handles at said one marginal edge portion of said panel, and the other pair of handles at said another marginal edge portion of said panel, the handles of each pair being spaced apart from each other, and each handle being grippable at the top exterior portion of said panel when extended upwardly to gripping position from a non-gripping position wherein the handles are substantially flush with upper surface of said panel and cannot be gripped for carrying.

18. The improvement set forth in claim 1 in which said at least one latch comprises a pin which is carried by said panel and which, in latching condition, passes into a hole in said vertical wall structure, and, in non-latching condition, is free of said hole, said panel further including a prop which is carried by said panel and has a free end capable of fitting said hole, and wherein said means for releasably securing said panel to said vertical wall structure comprises means for pivotally mounting said panel to said vertical wall structure for pivotal motion about a horizontal axis spaced from said hole, and said prop is so arranged on said panel for stowage essentially co-planar with said panel and for propping said panel in a non-horizontal position pivoted about said axis by fitting of said free end of said prop into said hole.

19. The improvement set forth in claim 1 including a weatherstrip seal extending peripherally around said panel into sealing engagement with said vertical wall structure.

20. In a pick-up truck having a chassis-mounted cargo box comprising a generally horizontal floor and a generally vertical vertical wall structure cooperating with said floor to form a cargo space which is bounded on the bottom by said floor and laterally by said vertical wall structure, but which is open at the top, said vertical wall structure comprising side walls extending fore and aft along opposite sides of the cargo space and a tailgate extending between said side walls along the rear of the cargo space, said tailgate being movable from a position laterally bounding the cargo space to a position which does not laterally bound the cargo space, and a tonneau cover cooperating with the open top of the cargo box to enclose the cargo space at the top, the improvement which comprises:

said cover comprising a relatively rigid, but relatively light-weight, panel, which, when disposed in cooperative relationship with the open top of the cargo box to enclose the cargo space, is generally horizontally disposed, said panel comprised of a relatively rigid plastic cellular core, a thin upper outer skin bonded to the upper and outer surfaces of the cellular core and a thin lower wall joined to the cellular core; means for releasably securing said panel to said vertical wall structure comprising two pairs of pins, one pair disposed on said panel for fitting into corresponding holes in one of said side walls, and the other pair disposed on said panel for fitting into corresponding holes in the other of said side walls, at least certain of said pins being movable into and out of the corresponding holes for enabling said panel to secured to and released from said vertical wall structure, operator means carried by said panel adjacent said tailgate for operating said certain movable pins and disposed such that when the panel is disposed on the box in covering relation to the cargo space and the gate is in laterally bounding relation to said cargo space, said operator means is inaccessible for operation;

and means for releasably locking said tailgate in laterally bounding relation to said cargo space by means of a key-operated mechanism which is accessible for operation exterior of the cargo space.

21. The improvement set forth in claim 20 in which all said pins are operated by said operator means for movement into and out of the corresponding holes.

22. The improvement set forth in claim 21 in which said means for releasably locking said tailgate is carried by said panel.

* * * * *